(No Model.)

I. C. DAVIS.
SPOOL.

No. 268,197. Patented Nov. 28, 1882.

Witnesses

Inventor
Ira C. Davis
by his Attorneys
Brown & Brown

UNITED STATES PATENT OFFICE.

INA C. DAVIS, OF MONTCLAIR, NEW JERSEY.

SPOOL.

SPECIFICATION forming part of Letters Patent No. 268,197, dated November 28, 1882.

Application filed July 3, 1882. (No model.)

*To all whom it may concern:*

Be it known that I, INA CRAVEN DAVIS, a subject of the Crown of Great Britain and Ireland, residing at Montclair, in the county of Essex and State of New Jersey, have invented a new and useful Improvement in Spools, of which the following is a specification.

My invention relates to spools for silk, linen, or cotton thread which have a projection on that one of the heads which is intended to be the lower head when the spool is placed on the spool-spindle of a sewing-machine, to prevent the thread from being wound around the spindle if it gets under the spool.

My invention consists in a spool having on its head a projection which is smaller than said head, and which tapers from a sharp outer edge upward and inward toward the head from which it projects, whereby thread if it gets under the spool will be directed upward or caused to wind on the projection close or near to the head.

Figure 1:
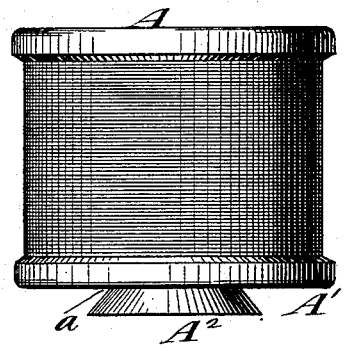
Figure 2:
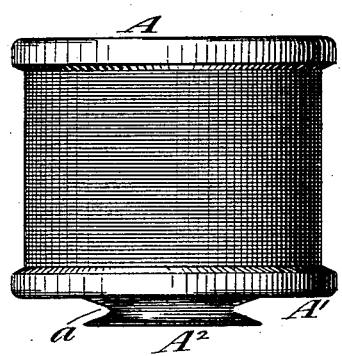

In the accompanying drawings, Figure 1 represents a side view of a spool of thread which embodies my invention; and Fig. 2 represents a corresponding view of a spool of thread having a projection on the head of slightly-modified form, but also embodying my invention. Both views are made on an enlarged scale for the sake of clearness, and similar letters of reference designate corresponding parts in both figures.

A A' designate the two heads of the spool, the latter of which, A', is intended to be the lower head when the spool is placed on the spool-spindle of a sewing-machine. On the lower head, A', is a projection, $A^2$, of circular form, and on the end of which the spool will be supported when in use on a sewing-machine. The projection $A^2$ is smaller in diameter than the head A', from which it projects. It has a sharp outer edge and tapers therefrom upward and inward toward the head A'. In the spool shown in Fig. 1 the taper of the projection $A^2$ is continued clear to the outer face of the head, thus making a groove, *a*, one side of which is formed by the head. In the spool shown in Fig. 2 the projection has a V-shaped groove, *a*, one face of which is continued from the bottom of the groove outward to the head, while the other face extends to the sharp outer edge of the projection. It will be seen that if the thread gets below the head A' the sharp outer edge of the projection $A^2$ will direct it upward into the groove *a*, and it can neither get below the projection nor wind around the projection unless it is in the groove.

What I claim as my invention, and desire to secure by Letters Patent, is—

A spool having on its head a projection which is smaller than said head, and which tapers from a sharp outer edge upward and inward toward the head, from which it projects, substantially as and for the purpose herein described.

INA C. DAVIS.

Witnesses:
 FREDK. HAYNES,
 ED. L. MORAN.